US012693870B2

(12) United States Patent
Steurer et al.

(10) Patent No.: US 12,693,870 B2
(45) Date of Patent: Jul. 28, 2026

(54) EDGE DEVICE CONFIGURATION SYSTEM AND METHOD

(71) Applicant: SCHREDER ILUMINAçAO SA, Carnaxide (PT)

(72) Inventors: Michael Steurer, Carnaxide (PT); Lourenço Bandeira, Carnaxide (PT); André Glória, Carnaxide (PT)

(73) Assignee: SCHREDER ILUMINAÃO SA, Carnaxide (PT)

( * ) Notice: Subject to any disclaimer, the term of this patent is extended or adjusted under 35 U.S.C. 154(b) by 81 days.

(21) Appl. No.: 18/292,149

(22) PCT Filed: Jul. 29, 2022

(86) PCT No.: PCT/EP2022/071401
§ 371 (c)(1),
(2) Date: Jan. 25, 2024

(87) PCT Pub. No.: WO2023/006970
PCT Pub. Date: Feb. 2, 2023

(65) Prior Publication Data
US 2025/0004791 A1 Jan. 2, 2025

(30) Foreign Application Priority Data

Jul. 29, 2021 (NL) ..................................... 2028884

(51) Int. Cl.
*G06F 9/44* (2018.01)
*G06F 9/445* (2018.01)

(52) U.S. Cl.
CPC ................................. *G06F 9/44505* (2013.01)

(58) Field of Classification Search
CPC .................. G06F 1/32; G06F 9/44; G06F 1/12
See application file for complete search history.

(56) References Cited

U.S. PATENT DOCUMENTS

| | | | |
|---|---|---|---|
| 2011/0130915 A1* | 6/2011 | Wright .................. | G01M 17/04 398/118 |
| 2015/0069045 A1* | 3/2015 | Coursey ............ | B01L 3/502715 219/494 |

(Continued)

FOREIGN PATENT DOCUMENTS

WO 2014147524 A1 9/2014

OTHER PUBLICATIONS

PCT International Search Report and Written Opinion, Application No. PCT/EP2022/071401, mailed Nov. 24, 2022, 14 pages.

*Primary Examiner* — Keshab R Pandey

(74) *Attorney, Agent, or Firm* — McDonnell Boehnen Hulbert & Berghoff LLP

(57) ABSTRACT

Example embodiments relate to edge device configuration systems and methods. An example edge device configuration system is for setting an initial configuration of one or more edge devices and/or for updating a configuration of one or more edge devices. Each edge device includes one or more sensors for obtaining environmental data. Each sensor is set up according to at least one configuration parameter. Each edge device also includes a processing means configured to process the environmental data in accordance with a processing model. The edge device configuration system includes a database storing a plurality of data models. A data model includes at least one of one or more processing models for one or more processing means of one or more edge devices or one or more configuration parameters for one or more sensors of one or more edge devices. The edge device configuration system also includes a control means.

18 Claims, 7 Drawing Sheets

(56)        References Cited

U.S. PATENT DOCUMENTS

| 2019/0103021 | A1  | 4/2019 | Rosen et al. |           |
|--------------|-----|--------|--------------|-----------|
| 2019/0104595 | A1* | 4/2019 | Rosen        | H04L 12/282 |
| 2019/0222652 | A1  | 7/2019 | Graefe et al. |          |

\* cited by examiner

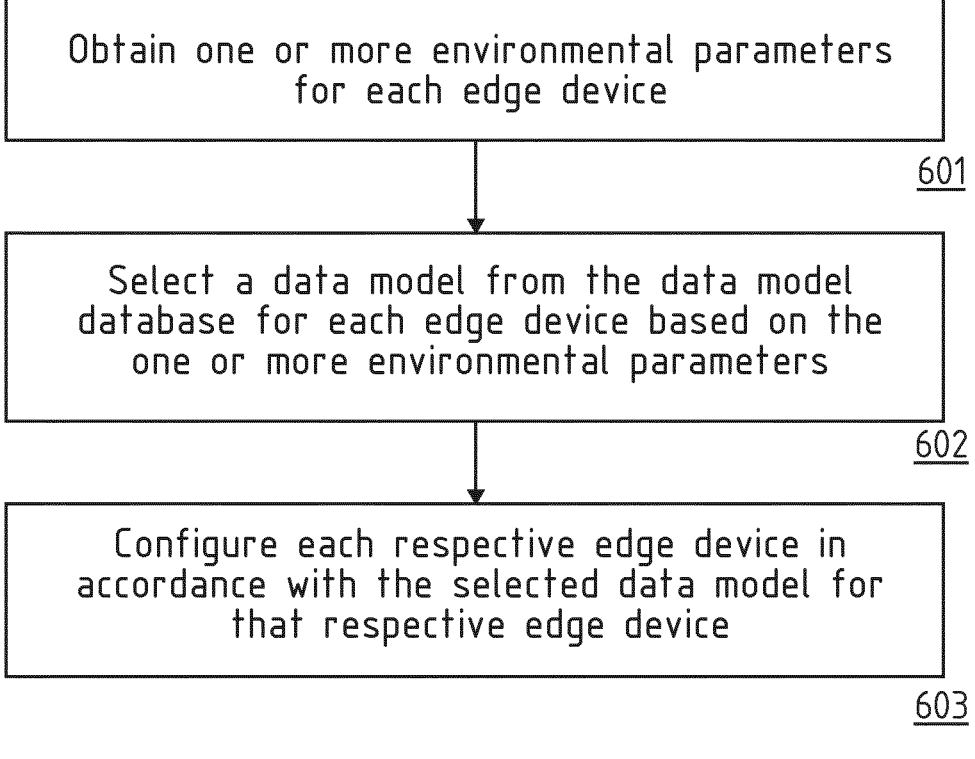

```
┌─────────────────────────────────────────────┐
│   Obtain one or more environmental parameters │
│            for each edge device               │
└─────────────────────────────────────────────┘
                                        601
                    │
                    ▼
┌─────────────────────────────────────────────┐
│     Select a data model from the data model   │
│   database for each edge device based on the  │
│     one or more environmental parameters      │
└─────────────────────────────────────────────┘
                                        602
                    │
                    ▼
┌─────────────────────────────────────────────┐
│   Configure each respective edge device in    │
│  accordance with the selected data model for  │
│         that respective edge device           │
└─────────────────────────────────────────────┘
                                        603
```

FIG. 6

EDGE DEVICE CONFIGURATION SYSTEM AND METHOD

CROSS-REFERENCE TO RELATED APPLICATIONS

The present application is a national stage entry of PCT/EP2022/071401 filed Jul. 29, 2022, which claims priority to NL 2028884 filed Jul. 29, 2021, the contents of each of which are hereby incorporated by reference.

FIELD OF INVENTION

The present invention relates to an edge device system for setting an initial configuration of one or more edge devices and/or for updating a configuration of one or more edge devices over time and a related method.

BACKGROUND

When installing sensors and processing units in a network of edge devices, configuring the edge devices is not a trivial task. When rolling out two or three edge devices, the configuration can be done manually by directly configuring the devices individually. Rolling out hundreds of edge devices, each comprising several sensors and specific processing means, is a very tedious task that requires a lot of time, resources and knowledge. In particular, at the scale of a city having a city wide network of luminaires, the configuration and/or update of the configuration over time of edge devices installed on all the luminaires represent a challenge in terms of time, cost and expertise.

SUMMARY

The object of embodiments of the invention is to provide edge device configuration system solving the drawbacks of the prior art.

According to a first aspect of the invention, an edge device configuration system is provided for setting an initial configuration of one or more edge devices and/or for updating a configuration of one or more edge devices over time. Each edge device comprises one or more sensors for obtaining environmental data, each sensor being set up according to at least one configuration parameter, and a processing means configured to process the environmental data in accordance with a processing model. The edge device configuration system comprises a data model database storing a plurality of data models and a control means. A data model comprises one or more processing models for one or more processing means of one or more edge devices and/or one or more configuration parameters for one or more sensors of one or more edge devices. The control means is configured to obtain one or more environmental parameters for each edge device, select a data model from the data model database for each respective edge device based on the one or more environmental parameters of that respective edge device, and configure each respective edge device in accordance with the selected data model (DM) for that respective edge device. An environmental parameter of an edge device is derived either from an external edge location database for a location where that edge device is installed (i.e. the environmental parameter is derived from edge location data for the respective edge device stored in an external edge location database), and/or from data received from that edge device (i.e. the received data may be the environmental parameter itself or data allowing to derive the environmental parameter).

In this way, the configuration or update of the configuration of one or more edge devices can be achieved automatically by control means selecting the data model adapted for the environment/use of the one or more edge devices. The edge devices can then be automatically configured using configuration parameters for the sensors and/or processing models for the processing means which are particularly adapted to their environment/use, in particular suited to their location or/and to the environmental conditions they may sense. A manual configuration of each individual edge device depending on their respective environmental parameters is thus then rendered superfluous.

Preferably, the data model database comprises all the possible combinations of configuration parameters and/or processing models for all available edge devices under all known environments.

Automatically is to be understood as meaning using a machine-based decision, preferably without a human intervention. Should the initiation of the configuration be triggered by an operator, the terms semi-automatic would then apply without diminishing the benefits of the invention. It is further noted that in the rest of the description the term "automatically" will be used to cover both automatic and semi-automatic options.

The external edge location database may store various types of edge location data. For example, the edge location database may specify any one or more of the following for an edge device:
   location coordinates;
   a map indicating the edge device;
   a type of location, such as street, park, city, countryside, etc.

The data received from the edge device to determine an environmental parameter may be any type of parameter which is useful to determine an environmental parameter of the edge device, and may comprise any one or more of the following:
   the environmental parameter itself, e.g. determined by the edge device based on sensed data;
   edge location data of the edge device, e.g. GPS coordinates measured by the edge device itself;
   environmental data sensed by the edge device or processed data based thereon.

The term "external" in "external database" indicates that the database is not part of the edge device. However, the database may be integrated with the control means, e.g. when the control means is provided in a cloud device or a fog device or another (edge) device.

An environmental parameter may be any parameter related to the surroundings of the edge device. An environmental parameter may relate to an event in the vicinity of an edge device, e.g. characteristics (presence, absence, state, number, direction, speed, wearing mask or not) of objects like vehicles, street furniture, animals, persons, sub-parts of the edge device, or properties related to the environment (like weather (rain, fog, sun, wind), pollution, visibility, earth quake) or security related events (explosion, incident, gun shot, user alarm) in the vicinity of the edge device.

According to an exemplary embodiment, the control means is configured to derive an environmental parameter by comparing edge location data from the edge location database and/or edge location data received from the edge device with data from one or more external databases, such as a landmarks database, a geo-localisation database specifying geographic coordinates of (optionally moving) objects in an area, a weather database, etc.

According to a preferred embodiment, the control means is configured to derive an environmental parameter from the external edge location database by comparing edge location data from the edge location database with landmark data from an external landmarks database for the locations and/or properties of landmarks in the area where the one or more edge devices are installed. In this way, a landmark of significance for the configuration of an edge device can be taken into account automatically by the control means when selecting the data model adapted to that edge.

A landmark may for example be a school, a public office, a hospital, a pedestrian crossing, a cycle path. By landmark is understood a location, an object, a structure or a building of particular interest on land. Among possible landmarks are the following:

a pathway structure of particular interest due to its properties and/or usage like a pedestrian crossing a car lane, a bridge, a tunnel, a bus stop, a parking, a roundabout, a standard motorway section, a pedestrian zone, a square, a bicycle lane, a standard street section, a crossroad, a conflict zone a bridge, etc.;

a building of particular interest due to its usage like a school, a bank, a public building, an airport, a train station, an industry hall, a stadium, a warehouse, etc.;

a natural or artificial location or object of particular interest due to its properties and/or usage like a water source, a marketplace, a bin a tree, a parking space.

This list is not exhaustive and other landmarks may be envisaged depending on circumstances.

In a preferred embodiment, the one or more environmental parameters derived from the edge location data retrieved from the external edge location database and/or from the data received from the edge device may comprise any one or more of the following: a landmark in the vicinity, a parameter related to one or more properties of a landmark in the vicinity of an edge device, such as the dimensions and/or usage of that landmark; a group identification parameter related to the identification of an edge device as belonging to a predetermined group of edge devices. A group identification parameter of an edge device may be based on any one or more of the following: a constitution of that edge device (e.g. type of sensor(s) present on that edge device, the type of processing means on the edge device, historical data such as last time since calibration of the sensor, an intended use of the edge device or of a sensor thereof, a brand of a sensor and/or of another component of the edge device), a type of environment (for example the presence of a landmark in the vicinity of that edge device), a location of that edge device, a type of application or usage of that edge device (e.g. detecting and/or counting objects), an operator/owner of the edge device, a fog device to which the edge device is attributed, among others.

In this way an edge device close to a landmark with specific properties may be configured specifically by the system in an automatic manner. More in particular a parameter related to one or more properties of a landmark in the vicinity of an edge device may comprise any one of the following: a parameter related to a safety risk level, such as the presence of a pedestrian crossing, a cycle path, a school, a bus stop; a parameter related to a privacy level, such as the presence of a hospital, a school, a public office; a parameter related to a standard associated with the landmark. In this way, an edge device close to a landmark with e.g. security or privacy issues may be configured specifically by the system in an automatic manner. A manual configuration of an edge device close to a landmark is thus then rendered superfluous.

In an exemplary embodiment an area, such as a street may comprise many edge devices, each edge device comprising one or more sensors. For example, an area may comprise a plurality of edge devices each comprising a camera. A first subset of the edge devices of the area may be grouped in a first group and a first processing model configured to detect a first type of objects (e.g. cars) may be selected for the first group. A second subset of the edge devices may be grouped in a second group and a second processing model configured to detect a second type of objects (e.g. persons) may be selected for the second group.

Further, the same type of objects may be sensed by different types of sensors within the same or a different edge device, as will be further detailed below.

According to a preferred embodiment, the one or more environmental parameters derived from data received from the one or more edge devices comprise any one or more of the following: a parameter derived from sensed environmental data (e.g. raw data) and/or processed data (e.g. based on the raw data) of an edge device; or a group identification parameter related to the identification of an edge device as belonging to a predetermined group of edge devices. A parameter derived from sensed environmental data and/or processed data of an edge device may comprise one of the following: a traffic related parameter, such as speed, number of cars/pedestrian/bicycle (i.e. road user) per hour; or a parameter related to an environmental condition, e.g. an environmental abnormality, such as the presence of a noise above/below a predetermined level, for instance above a noise level typical of airport traffic, a pollutant concentration above/below a predetermined threshold, an ambient temperature above/below a predetermined threshold, an ambient light level above/below a predetermined threshold, a visibility condition above/below a predetermined threshold, a wind speed above/below a predetermined threshold, a water level above/below a predetermined threshold, the detection of vehicles circulating in thermal mode in an area reserved for electric vehicles. It is further noted that the estimation of the quality of the sensed data received from an edge device, for example based on data from an external database, may be taken as well into account. This quality check may be done either in the edge device itself and/or in the control means which may be located e.g. in the cloud and/or in a fog device. As an example, data from a weather database (cloudy weather, sunny weather or windy conditions) may be taken into account to evaluate the quality of the sensed and/or processed data received from the edge device. Also other data may be taken into account, such as the output of an object classifying process performed by the edge device or by the control means based on sensed data. For example, if a class is determined that does not make sense, it may be derived that the quality of the sensed data was low. In this way, the environment to which an edge device is exposed and which may be of importance for its (re)configuration can be taken into account automatically by the control means when selecting the data model adapted to that edge.

According to a preferred embodiment, the control means is further configured to receive edge constitution data about the constitution of the one or more edge devices and to select the data model from the data model database for each respective edge device based on both the one or more environmental parameters and the edge constitution data of that respective edge device. The one or more environmental parameters relate to the surroundings of the edge device, whilst the edge constitution data relates to the edge device itself. In this way, the control means may automatically configure each edge device according to its own constitution. A data model adapted to the constitution and environment of a specific edge device may automatically be selected and applied to that edge device.

According to a preferred embodiment, the edge constitution data about the constitution of the one or more edge devices comprises any one or more of the following: the number of sensors on an edge device, the type of sensors on an edge device, the type of processing means on an edge device, historical data such as last time since calibration of the sensor, an intended use of the edge device or of a sensor thereof, a brand of a sensor and/or of another component of the edge device. In this way, different edge devices having different sensors and/or type of processing may be configured in a manner that is adapted to their specific constitution. In an example, if the edge device comprises three sensors, like a camera, a microphone and a radar for instance, the three sensors being used for data fusion, an appropriate data model comprising configuration parameters for these specific sensors and a processing model for the data fusion of these specific sensors may be automatically selected by the control means and applied. In another example, if the edge device comprises a single sensor, an appropriate data model with a configuration parameter for that sensor and a processing model for the data sensed by that sensor may be applied. Further, in another example, the selection of a data model may take into account the processing power of the edge device.

Examples of possible edge devices are described in PCT patent publications WO2022122755, WO2022122750, PCT/EP2022/056270 and N2031012 in the name of the applicant which are included herein by reference. It is further noted that multiple edge devices may be associated with a fog device, and that optionally grouping may take place in accordance with the associated fog device.

According to a preferred embodiment, the edge constitution data of an edge device is stored in a external edge constitution database. Alternatively or in addition, the edge constitution data of an edge device is received by the control means from that edge device. For example, the edge device could be provided with an RFID storing its own edge constitution data and this could be read by the control means. In this way, the edge constitution data can be obtained by the control means either from an external database and/or by requesting the data directly to the edge device self. For example, the type of sensor and processing means may be stored in the edge device itself but the number of sensors per edge device may be stored in a remote database. As specified above, external means that the database is not in the edge device, but it can be integrated with the control means which may comprise a cloud or a fog device.

According to a preferred embodiment, a processing model comprises rules for pre-processing the sensed environmental data and/or rules for further processing the pre-processed data. In particular, a processing model may comprise rules for state-estimating (pre-processing) the sensed environmental data and/or rules for classifying an event in the edge device or its vicinity, and/or rules for determining attributes associated to an event in the edge device or its vicinity, said attribute characterizing a property of the event. In this way, the (re-)configuration is specific to the processing effectively in use in an edge device at any level of the processing. State-estimation and/or classification data models may be selected and applied automatically to each edge device.

According to a preferred embodiment, the at least one configuration parameter comprises one or more of the following: an operating parameter for the sensor, such as a sampling rate, a frame rate, an exposure time, an aperture angle, a frequency, a power, an orientation angle; an operational status such as an on-state, an off-state, a sleep mode; a sensing range, such as a temperature range, a frequency bandwidth, a distance range; a sensing option, such as internal sensing, external sensing, a sensing protocol, a calibration parameter; a sensing profile; an encryption key. In this way, an edge device comprising a sensor of any type may be configured by the configuration system to operate according to a configuration parameter adapted at least to its environment. A sensing profile is a profile which defines one or more sensing settings, e.g. accuracy, acquisition rate, number of measurements, of the sensor in function of time.

In an exemplary embodiment, the environmental data is based on data sensed by a first sensor, e.g. a temperature sensor, and the configuration parameter included in the selected data model is a configuration parameter of another second sensor, e.g. a frame rate of a camera. For example, in this manner, the frame rate of a camera may be reduced when the temperature is higher than a predetermined threshold.

According to a preferred embodiment, the control means is configured to obtain a group identification parameter for at least two edge devices, and, if the obtained group identification parameter is the same for the at least two edge devices, to select the same data model from the data model database for those at least two edge devices, and configure those at least two edge devices in accordance with that selected same data model. It is noted that the group identification parameter of an edge device may be related to any one or more of the following: the constitution of that edge device (e.g. type of sensor(s) present on that edge device), the type of environment (for example the presence of a landmark in the vicinity of that edge device), the location of that edge device, the type of application or usage of that edge device, an owner/operator of the edge device, a fog device to which the edge device is attributed, among others. The group identification parameter of an edge device may be retrieved from a remote database and/or from that edge device. The group identification parameter may be derived from the external edge location database for a location where that edge device is installed, or from data received from that edge device directly. Further other options may be envisaged, depending on circumstances, using among others edge constitution data and/or landmark data. Alternatively, the control means is configured to select a data model from the data model database for at least two edge devices for which corresponding environmental parameters were received and configure those at least two edge devices in accordance with that same selected data model.

According to a preferred embodiment, the control means further comprise communications means for sending the data model to the one or more edge devices, and each edge device further comprises communication means for receiving said data model and optionally for sending an environmental parameter to the control means. In this way, the control means are able to configure the edge devices by sending each a data model. The communications means be configured to perform short and/or long range communication. Communication technologies that may be used include any one or more of: an IEEE 802.15.4-based protocol, such as a Zigbee protocol, WiFi, cellular (GPRS, 3G/4G/5G), LPWAN, e.g. a LoRaWAN or a SigFox, and power line communication networks.

According to a preferred embodiment, each edge device further comprises a communication means configured to communicate in accordance with a communication model and each data model further comprises a communication model. In this way, the communication model used by an edge device to communicate with the outside world, including for instance communications between edge devices and/or communications with a higher level of intelligence in the network, like a fog device or a cloud device, can be adapted by the control means. In particular, different communication frequencies are suited in different areas of the world, for instance in Europe and in the United States, such that a data model specific to an area may be set automatically the control means.

According to a preferred embodiment, each edge device is installed on a luminaire. In this way, a luminaire network with edge devices can be configured automatically in an efficient manner.

According to a preferred embodiment, the control means and/or the data model database are part of a cloud device. In this way, the (re-)configuration can be performed in a centralised manner, a cloud device being connected to each edge device and to the necessary database(s) and thus able to configure easily the network of edge devices. Alternatively or in addition, the control means and/or the data model database may be part of a fog device, wherein a fog device is associated with a subset of edge devices. In this way, a more regional approach to (re-)configuration may be chosen, where for instance a plurality of edge devices of the same type belonging to the same fog device and exposed to substantially the same environmental conditions may be configured with the same data model. The control means may also be distributed over a cloud and one or more fog devices.

According to another embodiment, a method for setting an initial configuration of one or more edge devices and/or for updating a configuration of one or more edge devices over time, preferably for a system according to any of the above embodiments is provided. The method comprises obtaining one or more environmental parameters for each edge device, selecting a data model from a data model database for each respective edge device based on the one or more environmental parameters for that respective edge device, and configuring each respective edge device in accordance with the selected data model for that respective edge device. Obtaining an environmental parameter of an edge device comprises deriving said environmental parameter either from an external edge location database for a location where that edge device is installed, and/or from data received from that edge device.

In this way, the configuration or update of the configuration of one or more edge devices can be achieved automatically by selecting the data model adapted for the environment of the one or more edge devices. The edge devices can then be automatically configured using configuration parameters for the sensors and/or processing models for the processing means which are particularly adapted to their environment, in particular suited to their location or/and to the environmental conditions they may sense. A manual configuration of each individual edge device depending on their respective environmental parameters is thus then rendered superfluous.

According to a preferred embodiment, deriving said environmental parameter from an external edge location database comprises receiving data from an external landmarks database for the locations and/or properties of landmarks in the area where the one or more edge devices are installed and comparing the data from the edge location database with the data from the landmark database. In this way, a landmark of significance for the configuration of an edge device can be taken into account automatically when selecting the data model adapted to that edge.

According to a preferred embodiment, selecting a data model from the data model database for each edge device based on the one or more environmental parameters further comprises receiving edge constitution data about the constitution of the one or more edge devices and selecting the data model from the data model database for each respective edge device based on both the one or more environmental parameters and the edge constitution data of that respective edge device. In this way, the control means may automatically configure each edge device according to its own constitution. A data model adapted to the constitution and environment of a specific edge device may automatically be selected and applied to that edge device.

The technical merits of the embodiments of the method apply mutatis mutandis on the various embodiments of the edge device configuration system. Also, the system may be configured to perform any one of the above disclosed method steps.

According to a preferred embodiment, the one or more sensors comprise at least one: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor, a vibration sensor, a metering device (e.g. a metering device for measuring the power consumption of a component of the edge device, more in particular a metering device for measuring the power consumption of a driver of a luminaire), a malfunctioning sensor (e.g. a sensor for detecting the malfunctioning of a component of the edge device such as a current leakage detector for measuring current leaks in a driver of a luminaire), a measurement device for measuring a maintenance related parameter of a component of the edge device, an alarm device (e.g. a push button which a user can push in the event of an alarming situation). In this way, environmental data about an event in the vicinity of an edge device or in the edge device may be detected, e.g. characteristics (presence, absence, state, number) of objects like vehicles, street furniture, animals, persons, sub-parts of the edge device, or properties related to the environment (like weather (rain, fog, sun, wind), pollution, visibility, earth quake) or security related events (explosion, incident, gun shot, user alarm) in the vicinity of the edge device, maintenance related data or malfunctioning data of a component of an edge device.

According to an exemplary embodiment, a sensor of the one or more sensors may be mounted in a housing of an edge device, e.g. a luminaire, in an orientable manner. An example of a suitable mounting structure is disclosed in WO 2019/243331 A1 in the name of the applicant which is included herein by reference. Such mounting structure may be used for arranging e.g. an optical sensor in the housing of an edge device. Other suitable mounting structures for sensors are described in WO 2019/053259 A1, WO 2019/092273 A1, WO 2020/053342 A1, WO 2021/094612 A1, all of which are in the name of the applicant and included herein by reference. Although those patent specifications relate in particular to luminaire edge devices in which one or more sensors are provided, the skilled person understands that one or more sensors may be mounted in a similar way in another type of edge device.

According to a preferred embodiment, the one or more sensors comprises an image sensor configured to sense raw image data of the event, wherein the edge processing means is configured to process the sensed raw image data using a processing model to select a class from a plurality of classes relating to the type of object involved in the event, to generate an image attribute associated with the event, and to include said class and said image attribute in the edge processed data which is sent to the control means. For instance, edges of an object may be extracted from a sensed image, or a license plate may be extracted from a sensed image. Alternatively, the plurality of classes may be related to the type of event or a property of the event.

According to a preferred embodiment, the one or more sensors comprises a sound sensor configured to sense sound data of the event, wherein the edge processing means uses a processing model to select a class from a plurality of classes according to the type of object involved in the event, and to include the determined class in the edge processed data which is sent to the control means. In this way, classification of objects like the classification of different types of vehicles may be achieved.

Additionally, an attribute associated to the sensed sound data may be also generated and aggregated to the sound classification. A sound attribute may be a sound level, a frequency of a sound, duration of said sound for instance. Preferably a sound attribute may be a frequency band related to a certain type of vehicle, e.g. a frequency band of the noise generated by electric cars/non electric cars. In this way a more complete and at the same time compact information may be transmitted from the edge device to the control means. Alternatively, the plurality of classes may be related to the type of event or a property of the event.

According to a preferred embodiment, the at least one data source comprises a radar sensor configured to sense radar data, wherein the edge processing means is configured to process the sensed radar image data in accordance with a processing model to select a class from a plurality of classes relating to the type of object involved in the event, to generate a speed attribute associated with said object, and to include said class and said speed attribute in the edge processed data which is sent to the control means. For instance, speed may be detected. The speed attribute may be aggregated to the radar classification. In this way, a more complete and at the same time compact information may be transmitted from the edge device to the control means. Alternatively, the plurality of classes may be related to the type of event or a property of the event.

More in particular, all three types of sensors: optical, sound and radar may be connected to the same common interface support such that the combination of sensors can be easily interconnected in any kind of edge device in a cost-effective manner.

In an exemplary embodiment, the communication between the edge devices and its associated control means may be based on a short range protocol such as IEEE 802.15.4 (e.g. Zigbee) and/or on a long range communication protocol such as LoRa wireless data communication technology.

According to a preferred embodiment, the one or more edge devices comprises any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, an access lid in a pavement. Existing structures ubiquitously present in cities may be used for hosting edge device functionalities, limiting in this way the aesthetic impact of installing such functionalities. Structures having already an access to the power grid are particularly interesting, while luminaires having just the right height to capture all kinds of valuable data from sensors are further particularly suited as edge devices.

BRIEF DESCRIPTION OF THE FIGURES

This and other aspects of the present invention will now be described in more detail, with reference to the appended drawings showing currently preferred embodiments of the invention. Like numbers refer to like features throughout the drawings.

FIG. 6 illustrates a method for configuring and/or updating a configuration of one edge device according to an embodiment.

DESCRIPTION OF THE EMBODIMENTS

Figure 1:
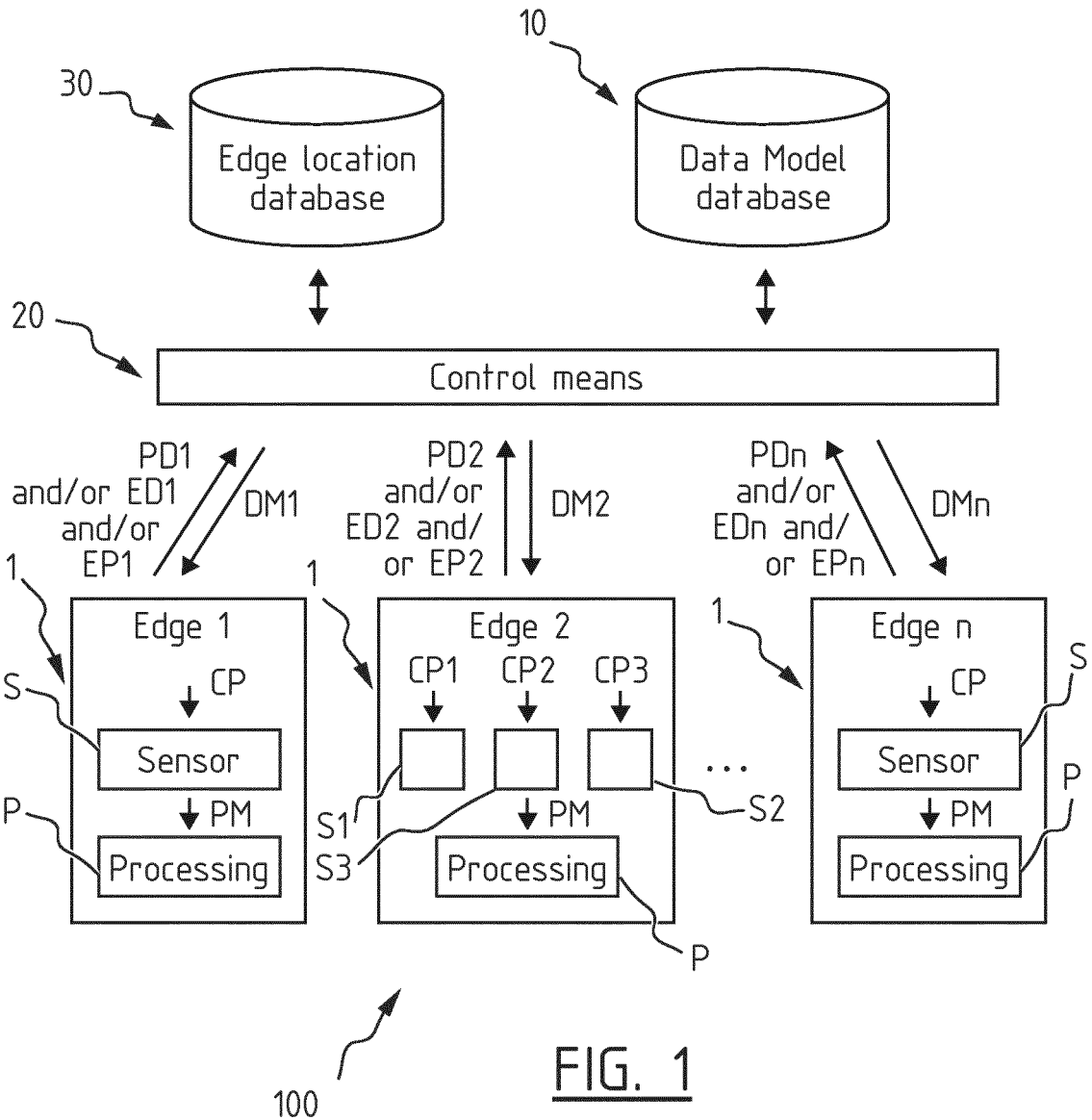
FIG. 1 illustrates an edge configuration system according to an embodiment.

FIG. 1 illustrates an edge configuration system according to an embodiment.

FIG. 1 illustrates an edge device configuration system 100 for setting an initial configuration of one or more edge devices 1 and/or for updating a configuration of one or more edge devices 1 over time. Updating a configuration over time of an edge device may as well be referred to in the rest of the text as reconfiguring that edge device. Each edge device 1 comprises one or more sensors S for obtaining environmental data ED and a processing means P configured to process the environmental data in accordance with a processing model PM. Each sensor S is set up according to at least one configuration parameter CP. Further each edge device 1 may have its respective constitution, including the number of sensors S on that edge device and/or the type of sensors S on that edge device, and/or the type of processing means P on that edge device and/or a brand of a component of the edge device and/or a use/application of the edge device, among other possible constitution criteria.

The edge device configuration system 100 of FIG. 1 comprises a data model database 10 storing a plurality of data models DM. A data model DM comprises one or more processing models PM for one or more processing means P of one or more edge devices 1 and/or one or more configuration parameters CP for one or more sensors S, S1, S2, S3 of one or more edge devices 1. For instance, for an edge device 1 comprising three sensors and a processing means, a data model for that specific edge may then comprise a processing model PM for the processing means P and three configuration parameters CP1, CP2, CP3, one for each sensor S1, S2, S3 of that edge, as illustrated for "Edge 2" in FIG. 1. The data model database 10 may thus comprise all the possible combinations of configuration parameters CP and/or processing models PM for all available edge devices 1 connected to the configuration system 100.

The edge configuration system 100 further comprises a control means 20 configured to obtain one or more environmental parameters EP for each edge device 1. An environmental parameter EP of an edge device 1 is derived from an external edge location database 30 for a location where that edge device 1 is installed, and/or derived from sensed raw environmental data ED (ED1, ED2 and ED3 in FIG. 1) or processed data PD (PD1, PD2, PD3 in FIG. 1) received from that edge device 1. It is also possible that the edge device 1 determines the environmental parameter EP (EP1, EP2 and EP3 in FIG. 1) and sends it to the control means 20. It is further noted that the estimation of the quality of the processed data PD or sensed data ED received from an edge device, e.g. based on data from an external database may be taken as well into account. As an example, data from a weather database (cloudy weather, sunny weather or windy conditions) may be taken into account when the first measure is taken and/or processed by the edge device for the first commissioning. By processed data PD it is meant data obtained by the processing means P when processing the environmental data ED obtained by the sensors S. The control means 20 is further configured to select a data model DM from the data model database 10 for each respective edge device 1 based on the one or more environmental parameters EP of that respective edge device 1, and configure each respective edge device 1 in accordance with the selected data model DM for that respective edge device. Configuring an edge device may then comprise applying the configurations parameters CP of the data model DM of that edge to the sensors S of that edge, and/or applying the processing model PM of the data model DM of that edge to the processing means P of that edge.

For example, the control means 20 may obtain an environmental parameter EP1 from the processed data PD1 received from the edge device 1 and derive another environmental parameter from the external edge location database, related to the location of the edge device 1. From these two parameters, the control means 20 may be configured to select a data model DM1 for that edge device 1 and to configure that edge device 1 according to that data model DM1.

It is noted that the plurality of edge devices 1 may be arranged at a plurality of locations. The edge devices 1 may for instance be spread in a smart-city and the plurality of edge devices 1 may comprise any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, a lid arranged in a pavement. This list is not exhaustive and other edge devices may be envisaged depending on circumstances.

The control means 20 and/or the data model database 10 may be part of a cloud device. In this way, the (re-)configuration can be performed in a centralised manner, a cloud device being connected to each edge device and to the necessary database(s) and thus able to configure easily the network of edge devices. Alternatively or in addition, the control means 20 and/or the data model database 10 may be part of a fog device, wherein a fog device is associated with a subset of edge devices. In this way, a more regional approach to (re-)configuration may be chosen, where for instance a plurality of edge devices of the same type belonging to the same fog device and exposed to substantially the same environmental conditions may be configured with the same data model. The control means may also be distributed over a cloud and one or more fog devices.

Figure 2:
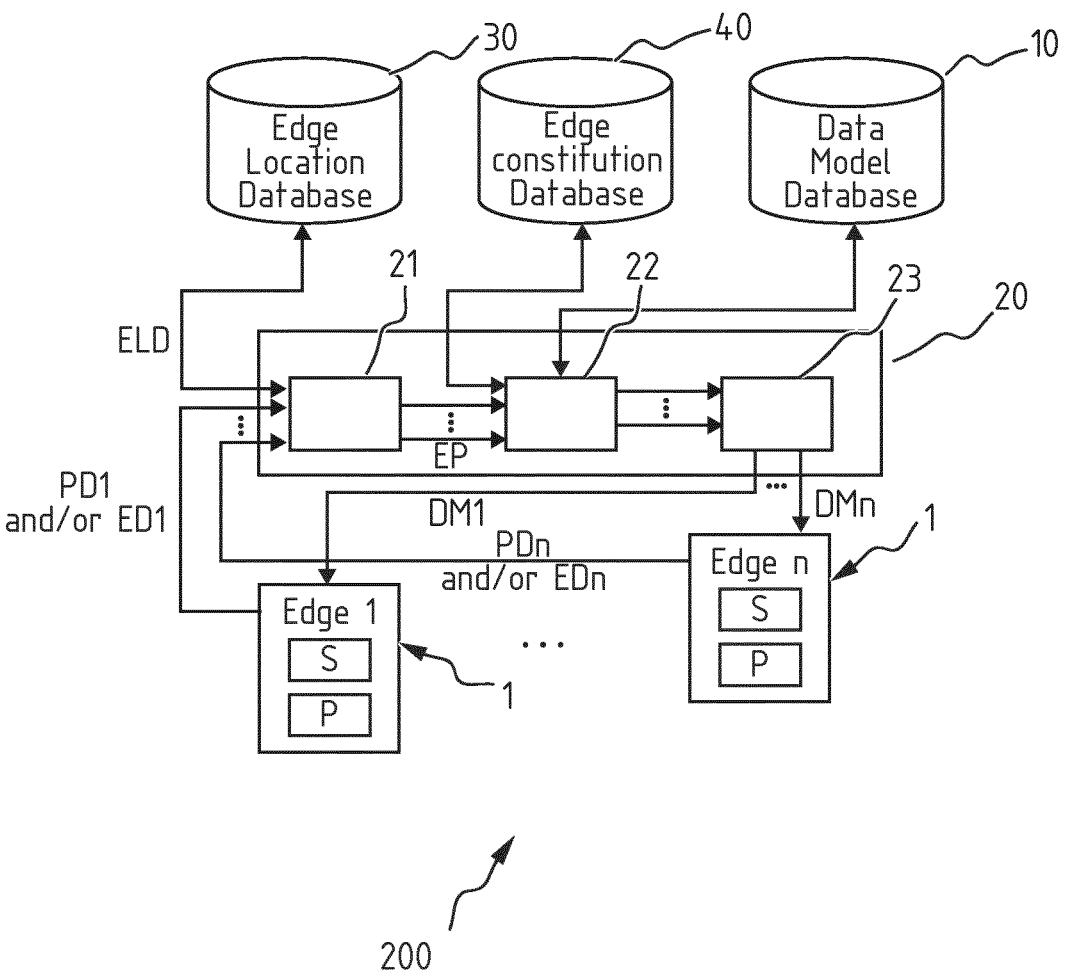
FIG. 2 illustrates an edge configuration system according to another embodiment.

FIG. 2 illustrates an edge configuration system according to another embodiment.

FIG. 2 illustrates an edge configuration system 200, differing from the edge configuration 100 in that the control means 20 may be configured to receive edge constitution data about the constitution of the one or more edge devices 1 and to select the data model DM from the data model database 10 for each respective edge device 1 based on the one or more environmental parameters EP of that respective edge device 1 and the edge constitution data of that respective edge device. As already explained above by constitution of an edge device it is meant for instance the number of sensors on an edge device and/or the type of sensors on an edge device and/or the type of processing means on an edge device and/or a brand of a component of the edge device and/or a use/application of the edge device.

The edge constitution data may be obtained in two ways which are not mutually exclusive. In some cases, the edge constitution data of an edge device may be stored in an external edge constitution database 40. Such an edge constitution database 40 may thus comprise all the possible combinations of sensors S and processing means P for all available edge devices 1 connected to the configuration system 200. In other cases, the edge constitution data of an edge device 1 may be received by the control means 20 from that edge device 1. A hybrid system where the edge constitution data of a first list of edge devices 1 may be obtained from a database 40 while the constitution data of a second list of edge devices 1 may be obtained from the edge devices of the second list may also be envisaged.

The edge configuration system 200 may for instance be particularly suitable for (re-)configuring edge devices 1 exposed to environmental conditions defined primarily by their location (GPS location for instance) and/or the type of data they may sense.

The control means 20 may comprise a module 21 for obtaining the one or more environmental parameters EP for each edge device 1, a module 22 for selecting a data model from the data model database for each respective edge device 1 and a module 23 for configuring each respective edge device 1 in accordance with the selected data model for that respective edge device. In particular the module 21 may obtain the one or more environmental parameters EP for each edge device 1 by deriving them from data, e.g. processed data PD and/or sensed environmental data ED, received from the one or more edge devices 1 and/or by deriving them from edge location data ELD retrieved from the external edge location database 30. The module 22 may select a data model DM from the data model database 10 for each respective edge device 1 based on the one or more environmental parameters EP of that respective edge device 1 and edge constitution data of that respective edge device 1 derived from the external edge constitution database 40.

Figure 3:
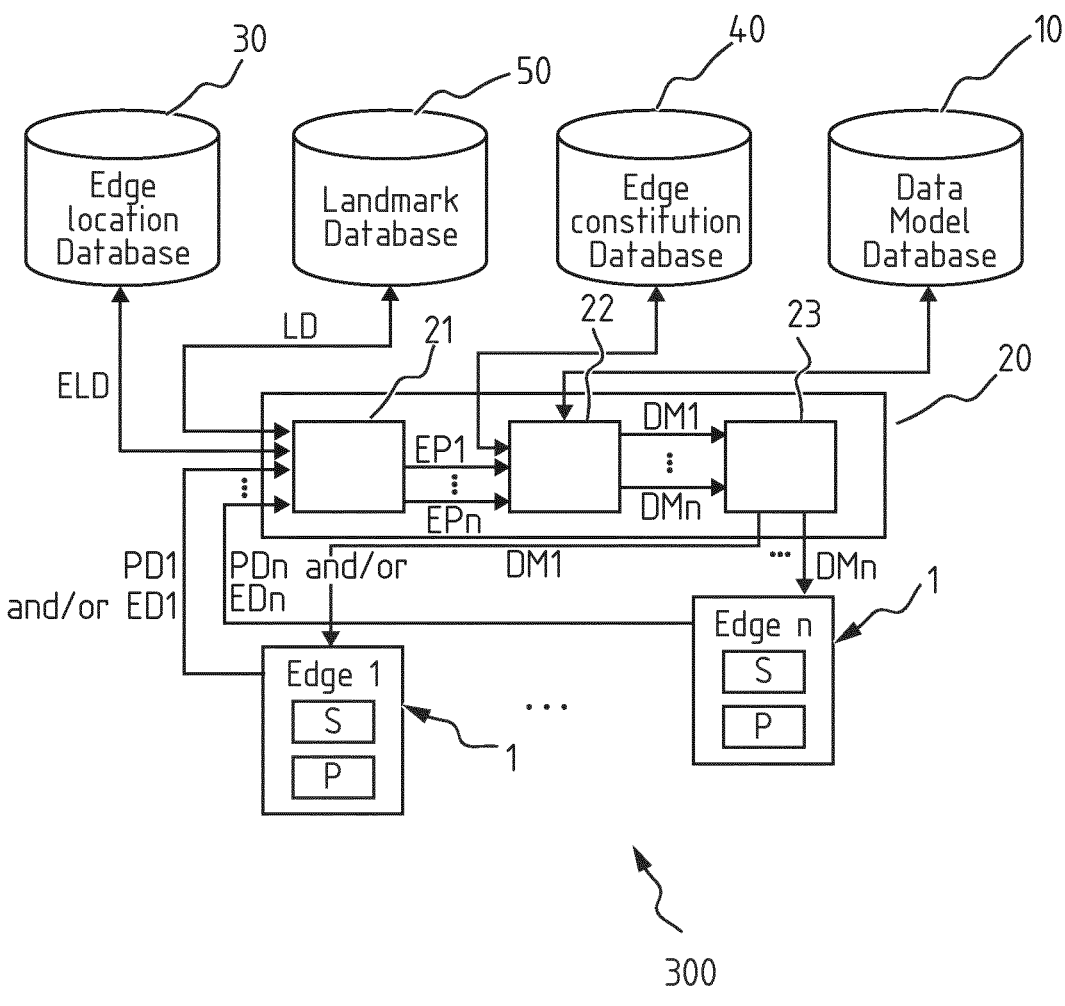
FIG. 3 illustrates an edge configuration system according to another embodiment.

FIG. 3 illustrates an edge configuration system according to another embodiment.

FIG. 3 illustrates an edge configuration system 300, differing from the edge configuration system 200 in that the control means 20 may further be configured to derive an environmental parameter EP from the external edge location database 30 by comparing edge location data ELD from the edge location database 30 with landmark data LD from an external landmarks database 50 for the locations and/or properties of landmarks in the area where the one or more edge devices 1 are installed. In other words the location of an edge device may be matched with a map of landmarks to identify if that edge device is located at or near a landmark. In this way, the data model of an edge device at or near a landmark may be automatically adapted to the specific environmental conditions of that landmark.

In particular, the one or more environmental parameters EP1 . . . EPn derived from edge location data ELD from the external edge location database 30 and/or from sensed and/or processed data ED, PD and/or from landmark data LD may comprise any one or more of the following: a parameter related to one or more properties of a landmark in the vicinity of an edge device, such as the dimensions and usage of that landmark; or a group identification parameter related to the identification of an edge device as belonging to a predetermined group of edge devices.

It is further noted that a parameter related to one or more properties of a landmark in the vicinity of an edge device may comprise any one of the following:

a parameter related to a safety risk level, such as the presence of a pedestrian crossing, a cycle path, a school;

a parameter related to a privacy level, such as the presence of a hospital, a school, a public office; a parameter related to a standard associated with the landmark.

The landmarks may thus be a school, a public office, a hospital, a pedestrian crossing, a cycle path.

By landmark is understood a location, an object, a structure or a building of particular interest on land. Among possible landmarks are the following:

a pathway structure of particular interest due to its properties and/or usage like a pedestrian crossing a car lane, a bridge, a tunnel, a bus stop, a parking, a roundabout, a standard motorway section, a pedestrian zone, a square, a bicycle lane, a standard street section, a crossroad, a conflict zone a bridge, etc.;

a building of particular interest due to its usage like a school, a bank, a public building, an airport, a train station, an industry hall, a stadium, a warehouse, etc.;

a natural or artificial location or object of particular interest due to its properties and/or usage like a water source, a marketplace, a bin a tree, a parking space.

This list is not exhaustive and other landmarks may be envisaged depending on circumstances.

Dimensions and properties associated with a landmark may comprise one of the following: a pathway width, an interval distance between two neighboring edge devices, a pathway surface material, pathway surface optical properties, a height at which the one or more sensors of the one or more edge devices is located from the ground, a number of lanes of the pathway, one or more circulation directions of the pathway, a lateral distance between the pathway and the one or more sensor of the one or more edge device, a lateral dimension of a hard shoulder of the pathway, an arrangement pattern of a group of edge devices from the one or more edge devices, a bracket length of a bracket holding the one or more sensor from the one or more edge devices, an inclination angle of the one or more sensor on the one or more edge device, a presence of a base support for the one or more sensor on the one or more edge device, a location of the base support respective to the one or more circulation directions, a proximity with a neighboring building, characteristics of the neighboring building, a number of sensor per base support, a presence of a conflict zone in the environment, a type of the pathway. This list is not exhaustive and other dimensions and properties of landmarks may be envisaged depending on circumstances.

The conflict zone may be defined as a zone where there is an increased potential for collision between pathway users, e.g. entry or exit lanes to the motorway, crossroads, roundabouts, pedestrian crossings, etc. The type of the pathway may be defined according to the type of user of the pathway, e.g. pedestrian, bicycle, motorized vehicle, according to the number of lanes and dimensions of the pathway, e.g. a street, a motorway, a secondary road, a local road, a road, a footpath, a sidepath, and/or according to an amount and frequency of traffic. The type of the pathway is usually classified on a national level taking into account one or more of the above mentioned parameters.

It is further noted that when edge device is installed on a luminaire, the presence of a landmark in its vicinity may be associated with a lighting standard, which in turn may have an influence on the data model for the sensor(s) and/or the processing means of that edge device.

The lighting site may be defined following different categories, each category corresponding to a different illumination scheme and/or type of a pathway within and/or neighboring the related lighting site. Generally, types of pathways are defined according to lighting regulations, or standards, of the geographical area where the lighting site is located, such as EN13201, IES RP-8, CIE 115. Other standards associated with landmarks may be envisaged depending on circumstances for safety issues, or confidentiality issues for instance.

For example, a landmark may be associated with a certain property like a speed limitation. A speed limitation may have an impact on the required light intensity of the luminaire, impacting the frequency at which a camera sensor should sense data. The control means may then based on obtaining the properties of the landmark associated to that edge device, select a data model suitable for configuring the camera sensor to operate at a suitable frequency, and configure the edge device with that selected data model to achieve improved sensing at that speed limitation.

It is further noted that the one or more environmental parameters EP received from the one or more edge devices 1 or determined by the control means 20 may comprise for example any one or more of the following: a parameter derived from sensed environmental data (ED) and/or processed data (PD) of an edge device, a group identification parameter related to the identification of an edge device as belonging to a predetermined group of edge devices.

A parameter derived from sensed and/or processed environmental data of an edge device may comprise any one of the following:

a traffic related parameter, such as speed, number of cars per hour;

a parameter related to an environmental condition, e.g. an environmental abnormality, such as the presence of a noise above/below a predetermined level, a pollutant concentration above/below a predetermined threshold, an ambient temperature above/below a predetermined threshold, an ambient light level above/below a predetermined threshold, a visibility condition below/above a predetermined threshold, a wind speed above/below a predetermined threshold, a water level above/below a predetermined threshold, the detection of vehicles circulating in thermal mode in an area reserved for electric vehicles.

Like numbers refer to like features throughout the drawings. The module 21 of the control means 20 may obtain the one or more environmental parameters EP for each edge device 1 by deriving them from data, e.g. processed data PD, received from the one or more edge devices 1 and/or by deriving them from edge location data ELD from the external edge location database 30 by comparing data ELD from the edge location database 30 with landmark data LD from an external landmarks database 50 for the locations and/or properties of landmarks in the area where the one or more edge devices 1 are installed.

Figure 4:
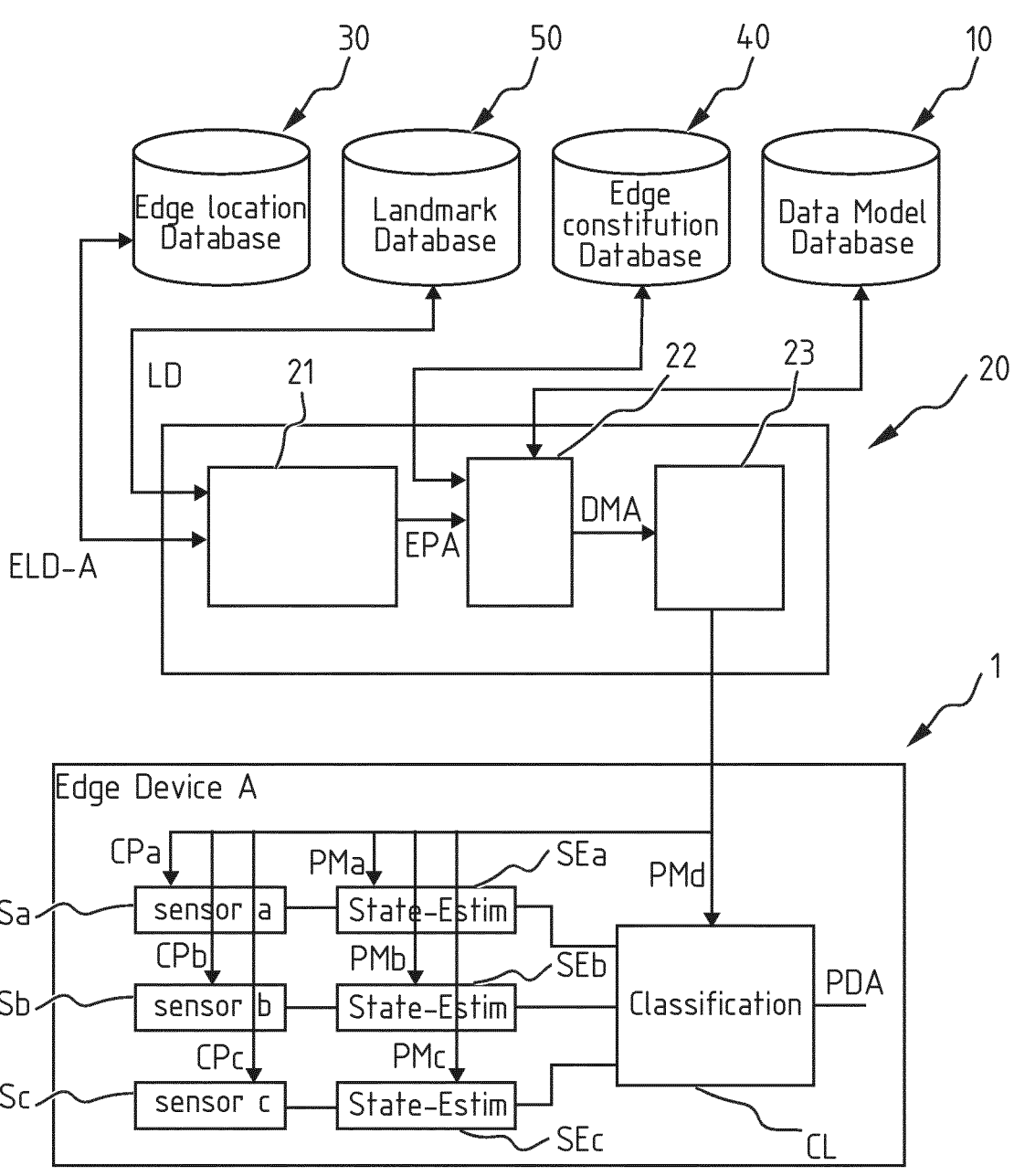
FIG. 4 illustrates an edge configuration system according to the embodiment of FIG. 3, in use, for configuring an edge device of a specific type for the first time.

FIG. 4 illustrates an edge configuration system 300 according to the embodiment of FIG. 3, in use, for configuring an edge device 1 of a given type for the first time.

The control means 20 comprises modules 21, 22, 23. Module 21 is configured to receive edge location data ELD-A from the external edge location database 30 and landmark data LD from an external landmarks database 50 and to determine environmental data EPA based thereon. The module 22 may select a data model DMA from the data model database 10 for each respective edge device 1 based on the one or more environmental parameters EPA and edge constitution data of that respective edge device 1 derived from the external edge constitution database 40. Module 23 is configured for configuring each respective edge device 1 in accordance with the selected data model DMA for that respective edge device.

As previously explained, each edge device 1 may have its respective constitution, regarding the number of sensors Sa, Sb, Sc on that edge device 1, the type of sensors Sa, Sb, Sc on that edge device, and the type of processing means P (combination of SEa, SEb, SEc and CL in FIG. 4) on that edge device among other possible constitution criteria. The edge device 1 of FIG. 4 will be referred to as an edge device of type A.

A processing means P may be configured to process the environmental data in accordance with a processing model PM (combination of PMa, PMb, PMc and PMd in FIG. 4). The processing in itself may comprise a pre-processing step, or a combination of a pre-processing step and a processing step such that a processing model PM may comprise rules (processing models PMa, PMb, PMc in FIG. 4) for pre-processing the sensed environmental data EDa, EDb, EDc, and/or rules (processing model PMd in FIG. 4) for processing the pre-processed data. In particular, a processing model PM may comprise rules for filtering and/or state-estimating the sensed environmental data EDa, EDb, EDc and/or rules for classifying an event in the edge device 1 or its vicinity, and/or rules for determining attributes associated to an event in the edge device 1 or its vicinity, said attribute characterizing a property of the event. By state estimating is to be understood extracting a feature related to an event.

An event in an edge device or its vicinity may comprise one of:

an event related to an object (both static and dynamic) in the edge device or its vicinity and/or the state of an object in the edge device or its vicinity, where objects may be vehicles, animals, persons, buildings, street furniture (trash bin, bus stop), a communication cabinet, a charging station, a street sign, a traffic sign, a traffic light, a telecommunication cabinet, objects thrown in a trash bin, other objects not part of the edge device self. For instance may then be detected the presence/movement of vehicles and other objects, whether people are wearing a mask or not, a trash bin reaching its full state, the type of object thrown in a trash bin, a surface, such as a street or pavement surface, changing from a dry to a wet state, the state of a traffic sign or a traffic light, the state (in use or not) of a charging station, the state of a parking space;

an event related to a state of a component of the edge device. For instance a fault condition (leakage current failed surge protection device, power failure, solder joint failure) in a luminaire head may be detected;

an event related to the environment itself, for instance the detection of a visibility condition, the detection of a change in the weather like rain, fog, sun, wind, the detection of a pollution level, the detection of a light level, the detection of an incident in the vicinity of the edge device such as a security related incident, e.g. an explosion, a car accident, a fire, flooding, presence of gas (chemicals), radiation, smoke.

The list above is not exhaustive, and other events of interest may be detected depending on the circumstances and the purpose of the network system.

An event may be classified into a predetermined set of classes and associated with a predetermined list of attributes, depending on the event. In particular, the following sets of classes and attributes may be of interest for the following events/objects involved in events:

for vehicles, classification may be by type of vehicle (car, truck, motorcycle, bicycle), size of vehicle (big, small, intermediate), model of vehicle, color of vehicle; and a corresponding set of attributes may be number plate, speed, direction, number of occupants;

for animals, classification may be by type of animal; leashed or not; normal/violent behavior for persons, classification may be by type of individual whether civil/military/policeman/first responder; normal/violent behavior, moving/static, wearing a mask/not wearing a mask; and a corresponding list of characterization attributes may be speed, direction, number of people;

for buildings, classification may be by type of building; an attribute may be the location, for street furniture, classification may be by type, status; an attribute may be the location;

for a driver for driving a light source of a luminaire, classification may be by status (normal/abnormal behavior), attributes may be the power consumption value;

for a trash bin, a traffic light, a charging station, a parking station, classification may be by status (full/not full, available/unavailable, operational/out of order), attributes may be the location for a street or pavement surface, classification may be according to status (dry/wet), attribute may be the amount of humidity, an attribute may be the location;

for a visibility condition, classification may be good/bad visibility;

for a noise, classification may be by noise level above a threshold, attributes may be frequency, level, duration of the noise;

for a change in the weather, classification may be by type of weather (fog, sun, rain, wind); attributes may be the amount of rain, humidity level, snow level, wind speed, the temperature, the light level;

for a pollution level, classification may be safe/warning/unsafe, presence of pollutants; attributes may be the value ppm of pollutants;

for a security related incident, classification may be the type of incident; attributes may be the noise in dB, the location, the radiation level, a chemical composition.

The list above is not exhaustive, and other classes and/or attributes may be used depending on the circumstances and the purpose of the network system.

For example, FIG. 4 illustrate an edge device 1 of type A comprising three sensors Sa, Sb, Sc each connected to a respective state-estimation element SEa, SEb, SEc, wherein the outputs of the state-estimation element are connected to a common classification element CL for classifying data fused from the sensors Sa, Sb, Sc. The processed data PDA may for instance be a class attributed to an event in the edge device 1 of type A which was sensed by all three sensors Sa, Sb, Sc. Each Sensor may receive a configuration parameters CPa, CPb, CPc for sensing, and each state-estimation element may receive a respective processing model PMa, PMb, PMc comprising thresholds for state-estimating, while the classification element CL may receive a processing model PMd comprising a list of classes for classifying the event based on the outputs of state-estimation elements SEa, SEb, SEc.

In FIG. 4, the processing data PDA of the edge device 1 of type A has not been represented fed back to the control means 20 because FIG. 4 illustrates an hypothetical situation of an initial configuration in which the edge device 1 is not yet operational, such that processed data is not yet available by the control means 20. Yet when updating the configuration, the processed data PDA of an edge device 1 may of course be transmitted to the control means 20 as illustrated in previous FIGS. 1-3.

It is noted that the at least one configuration parameter CPa, CPb, CPc may comprise one or more of the following: an operating parameter for the sensor, such as a sampling rate, a frame rate, an exposure time, an aperture angle, a frequency, a power, an orientation angle; an operational status such as an on-state, an off-state, a sleep mode; a sensing range, such as a temperature range, a frequency bandwidth, a distance range; a sensing option, such as internal sensing, external sensing, a sensing protocol, a calibration parameter; an encryption key.

Figure 5:
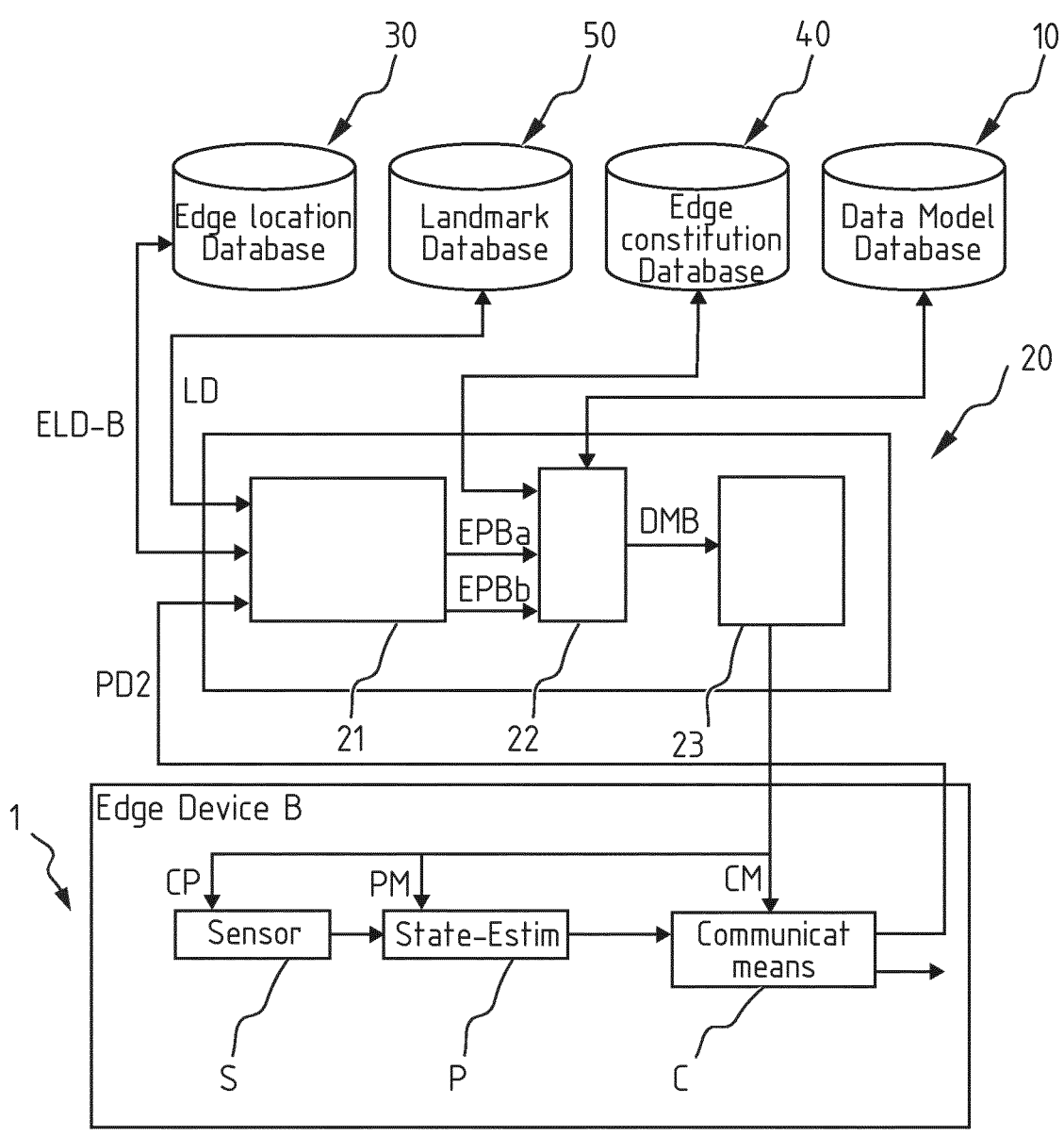
FIG. 5 illustrates an edge configuration system according to another embodiment, in use, for updating the configuration of an edge device of another type.

FIG. 5 illustrates an edge configuration system according to another embodiment, in use, for updating the configuration of an edge device 1 of another type, different from type A. The edge device of FIG. 5 will be referred to as an edge device of type B.

According to a further embodiment, each edge device may further comprise a communication means C configured to communicate in accordance with a communication model CM. Each data model further may then comprise a communication model CM. In FIG. 5, an edge device of type B is illustrated which comprises a single sensor S, connected to a state-estimation element as processing means P and a communication means C. The data model DM2 selected to reconfigure the edge device 1 of type B may then comprise a configuration parameter CP for the sensor S, a processing model PM for the State-estimation element P and a communication model CM for the communications means C. In particular, there may be different norms for communication frequencies in different areas of the world, for instance in Europe and in the United States, such that a communication model CM specific to an area may be necessary. The control means may then select a data model DM with a communication model CM adapted for each edge device environmental conditions, including location and/or sensed data.

FIG. 6 illustrates a method for setting an initial configuration of one or more edge devices and/or for updating a configuration of one or more edge devices over time, preferably for a system according to any of the above embodiments. The method comprises in step 601 obtaining one or more environmental parameters for each edge device, wherein obtaining an environmental parameter of an edge device comprises either deriving said environmental parameter from an external edge location database for a location where that edge device is installed, and/or deriving said environmental parameter from data received from that edge device, subsequently in step 602 selecting a data model from the data model database for each respective edge device based on the one or more environmental parameters for that respective edge device, and finally in step 603 configuring each respective edge device in accordance with the selected data model for that respective edge device.

The step 601 may comprise determining one or more environmental parameters based on edge location data (either obtained from a database or obtained from the edge device) and/or environmental data sensed by the edge and optionally processed and/or data from an external database such as a landmarks database or a weather database.

As illustrated in FIG. 5, the step 601 of obtaining said environmental parameter from an external edge location database may comprise receiving data from an external landmarks database for the locations and/or properties of landmarks in the area where the one or more edge devices are installed and comparing the data from the edge location database with the data from the landmark database. Alternatively, the step 601 of obtaining said environmental parameter may comprise receiving edge location data received from the edge device and landmark data from a landmarks database for the locations and/or properties of landmarks in the area where the edge device is installed and deriving an environmental parameter of the edge device based thereon.

As illustrated in FIG. 4, the step 602 of selecting a data model from the data model database for each edge device based on the one or more environmental parameters may further comprise receiving edge constitution data about the constitution of the one or more edge devices and selecting the data model from the data model database for each respective edge device based on both the one or more environmental parameters and the edge constitution data of that respective edge device.

Figure 7:
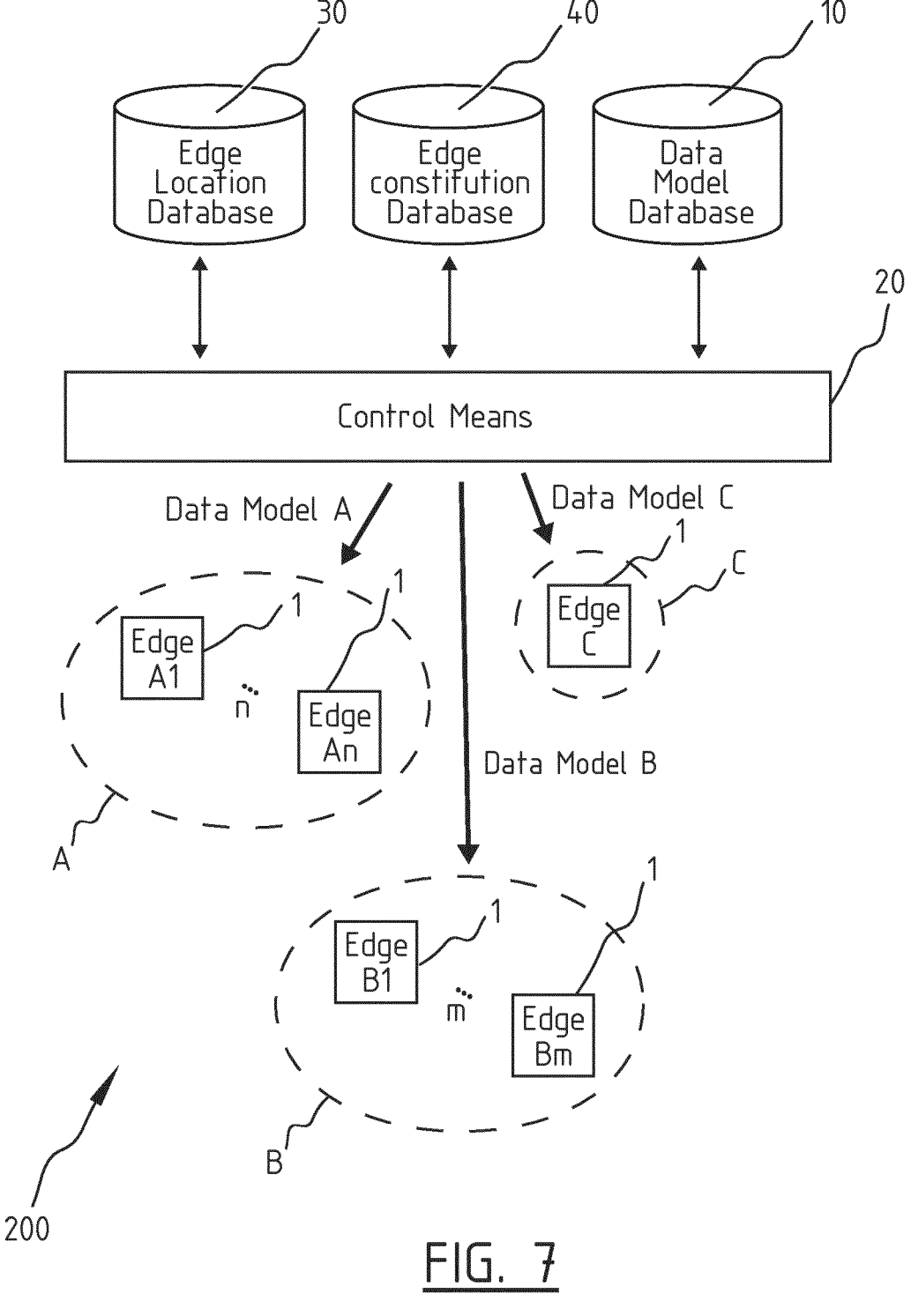
FIG. 7 illustrates an edge configuration system according to the embodiment of FIG. 2, in use for configuring edge devices grouped by type in a plurality of areas.

FIG. 7 illustrates an edge configuration system 200 according to the embodiment of FIG. 2, in use for configuring edge devices 1 grouped by type in a plurality of areas. According to another embodiment, the control means 20 may be configured to select a data model DM from the data model database for at least two edge devices 1 for which corresponding environmental parameters EP were received, and configure those at least two edge devices 1 in accordance with that same selected data model DM.

FIG. 7 illustrates for example a configuration system 200 for (re-)configuring a plurality of edge devices 1 arranged in a plurality of areas. In an area A, a first type A of edge devices 1, labelled Edge Device A1 to Edge Device An may be arranged, while in an area B a second type B of edge devices 1, labelled Edge Device B1 to Edge Device Bm may be arranged, while in an area C a single edge device of a third type C may be arranged. In each area, the edge devices being identical or having a common property, the control means may, based on the recognition of their location as part of a given area, configure all edge devices of that area with the same data model. Edge devices may thus be grouped based on their location and a respective data model may be associated with each group of edge devices. The number of areas as well the number of edge devices per area is illustrative only.

In the illustrated embodiment, each edge device belongs to a single area, yet it could be envisaged that areas may overlap in which case an edge device belonging to multiple areas would then be operated using more than one data model.

In an alternative embodiment, edge devices may be grouped based on their constitution instead of their location.

For instance, all edge devices having the same constitution, for instance comprising only a microphone sensor, may be attributed to a group associated with a respective data model.

In a further embodiment, the groups of edge devices may evolve in time, to follow the changes to the plurality of edge devices (addition/removal of edge devices, modification of constitutions by addition/removal of sensors). The grouping may thus be varied over time and/or multi-variable, including among others the location, the constitution of each edge device but also for instance the landmarks in the vicinity of the edge devices. The group identification parameter may be derived from the external edge location database 30 for a location where that edge device is installed, or from data received from that edge device directly. Further other options may be envisaged, depending on circumstances, using among other edge constitution data and/or landmark data.

By grouping edge devices, the configuration of an edge device may be simplified in that the control means may be configured to obtain a group identification parameter of an edge device and directly select a data model for that edge device based on the obtained group identification parameter. A group identification parameter is related to the identification of an edge device as belonging to a specific predetermined group. The data model database may indeed contain data linking predetermined groups with predetermined data models. In that sense configuration may be simplified in that a single environmental parameter, namely the group identification may suffice to select an appropriate data model.

It is noted that all databases mentioned in the present invention may evolve over time to follow the changes of the edge devices. The data model database, location database, landmark database and constitution database may be updated over time to allow reconfiguring over time the one or more edge devices.

It is noted that in an embodiment, the control means and/or the data model database may be part of a cloud device. Alternatively or in addition, the control means and/or the data model database may be part of a fog device situated in between a subset of edge devices and a cloud device. The cloud device, respectively the fog device, may have the communication and processing capabilities to (re-)configure the edge devices connected to it in an efficient and automatic manner. The control means may also be distributed over a cloud device and one or more fog devices.

Whilst the principles of the invention have been set out above in connection with specific embodiments, it is understood that this description is merely made by way of example and not as a limitation of the scope of protection which is determined by the appended claims.

The invention claimed is:

1. An edge device configuration system for setting an initial configuration of two or more edge devices and/or for updating a configuration of two or more edge devices over time, each edge device comprising:

one or more sensors for obtaining environmental data, each sensor being set up according to at least one configuration parameter; and a processing unit configured to process the environmental data in accordance with a processing model, the edge device configuration system comprising:

a data model database storing a plurality of data models, wherein a data model comprises at least one of one or more processing models for one or more processing units of one or more edge devices or one or more configuration parameters for one or more sensors of one or more edge devices; and a controller which is part of at least one of a cloud computing device and a fog computing device, the controller being configured to:

obtain one or more environmental parameters for each edge device, wherein an environmental parameter of an edge device is derived from at least one of: an external edge location database for a location where that edge device is installed or data received from that edge device;

select a data model from the data model database for each respective edge device based on the one or more environmental parameters of that respective edge device; and configure each respective edge device in accordance with the selected data model for that respective edge device.

2. The edge configuration system according to claim 1, wherein the data model database stores multiple data models, each data model thereof comprising one or more processing models configured for processing environmental data sensed by the one or more sensors, and wherein the controller is configured to select one of said multiple data models for each edge device.

3. The edge configuration system according to claim 2, wherein the one or more processing models comprise a processing model configured for classifying an event based on environmental data sensed by the one or more sensors, and wherein the one or more processing models comprise preferably a processing model configured for classifying an event based on environmental data sensed by multiple sensors.

4. The edge configuration system according to claim 1, wherein the edge device is configured to control a luminaire based on an output generated by the one or more processing models of a selected data model.

5. The edge configuration system according to claim 1, wherein the data model database stores multiple data models, each data model thereof comprising one or more configuration parameters for configuring the one or more sensors, wherein the one or more configuration parameters comprise one or more of the following: an operating parameter for the sensor, such as a sampling rate, a frame rate, an exposure time, an aperture angle, a frequency, a power, or an orientation angle; an operational status such as an on-state, an off-state, or a sleep mode; a sensing range, such as a temperature range, a frequency bandwidth, or a distance range; a sensing option, such as internal sensing, external sensing, a sensing protocol, or a calibration parameter; or an encryption key.

6. The edge configuration system according to claim 1, wherein the controller is configured to:

obtain a group identification parameter for at least two edge devices;

if the obtained group identification parameter is the same for the at least two edge devices, select the same data model from the data model database for those at least two edge devices; and configure those at least two edge devices in accordance with that selected same data model.

7. The edge configuration system according to claim 1, wherein an environmental parameter is derived from the external edge location database by comparing data from the edge location database with data from an external landmarks database for the locations and/or properties of landmarks in the area where the one or more edge devices are installed.

8. The edge configuration system according to claim 1, wherein the one or more environmental parameters derived based on edge location data from the external edge location database and/or based on data received from the edge device comprise any one or more of the following:

a parameter related to one or more properties of a landmark in the vicinity of an edge device, such as the dimensions and/or usage of that landmark; or a group identification parameter related to the identification of an edge device as belonging to a predetermined group of edge devices, wherein a parameter related to one or more properties of a landmark in the vicinity of an edge device preferably comprises any one of the following:

a parameter related to a safety risk level, such as the presence of a pedestrian crossing, a cycle path, or a school;

a parameter related to a privacy level, such as the presence of a hospital, a school, or a public office; or a parameter related to a standard associated with the landmark.

9. The edge configuration system according to claim 1, wherein the one or more environmental parameters derived from data received from the one or more edge devices comprise any one or more of the following:

a parameter derived from sensed environmental data and/or processed data of an edge device;

a group identification parameter related to the identification of an edge device as belonging to a predetermined group of edge devices, wherein a parameter derived from sensed environmental data and/or processed data of an edge device preferably comprises any one of the following:

a traffic related parameter, such as speed, number of cars per hour; or a parameter related to an environmental condition, e.g. an environmental abnormality, such as the presence of a noise above/below a predetermined level, a pollutant concentration above/below a predetermined threshold, an ambient temperature above/below a predetermined threshold, an ambient light level above/below a predetermined threshold, a visibility condition below/above a predetermined threshold, a wind speed above/below a predetermined threshold, a water level above/below a predetermined threshold, or the detection of vehicles circulating in thermal mode in an area reserved for electric vehicles.

10. The edge configuration system according to claim 1, wherein the controller is further configured to receive edge constitution data about the constitution of the one or more edge devices and to select the data model from the data model database for each respective edge device based on the edge constitution data of that respective edge device, and wherein preferably the edge constitution data about the constitution of the one or more edge devices comprises any one or more of the following: the number of sensors on an edge device, the type of sensors on an edge device, the type of processing unit on an edge device, or historical data such as last time since calibration of the sensor.

11. The edge configuration system according to claim 10, wherein the edge constitution data of an edge device is at least one of the following: stored in an external edge constitution database or received by the controller from that edge device.

12. The edge configuration system according to claim 1, wherein a processing model comprises rules for pre-processing the sensed environmental data and/or rules for processing the pre-processed data.

13. The edge configuration system according to claim 1, wherein a processing model comprises rules for state-estimating the sensed environmental data, and/or classes for classifying an event in the edge device or its vicinity, and/or attributes associated to an event in the edge device or its vicinity, said attribute characterizing a property of the event.

14. The edge configuration system according to claim 1, wherein the controller further comprises a communication device configured to perform at least one of short and long range communications, the communication device being configured for sending the data model to the one or more edge devices, and wherein each edge device further comprises a communication device configured to perform at least one of short and long range communications, the communication device being configured for receiving said data model and/or optionally for sending data such as environmental data or an environmental parameter to the controller.

15. The edge configuration system according to claim 1, wherein each edge device further comprises a communication device configured to perform at least one of short and long range communications, the communication device being configured to communicate in accordance with a communication model, and wherein each data model further comprises a communication model.

16. The edge configuration system according to claim 1, wherein each edge device is installed on a luminaire.

17. An edge device configuration system for setting an initial configuration of two or more edge devices and/or for updating a configuration of two or more edge devices over time, each edge device comprising:

one or more sensors for obtaining environmental data, each sensor being set up according to at least one configuration parameter; and a processing unit configured to process the environmental data in accordance with a processing model, the edge device configuration system comprising:

a data model database storing a plurality of data models, wherein a data model comprises one or more processing models for one or more processing units of one or more edge devices; and a controller which is part of at least one of a cloud computing device and a fog computing device, the controller being configured to:

obtain one or more environmental parameters for each edge device;

select a data model from the data model database for each respective edge device based on the one or more environmental parameters of that respective edge device; and configure each respective edge device in accordance with the selected data model for that respective edge device, wherein the one or more processing models comprise a processing model configured for classifying an event based on environmental data sensed by the one or more sensors.

18. An edge device configuration system for setting an initial configuration of two or more edge devices and/or for updating a configuration of two or more edge devices over time, each edge device comprising:

one or more sensors for obtaining environmental data, each sensor being set up according to at least one configuration parameter; and a processing unit configured to process the environmental data in accordance with a processing model, the edge device configuration system comprising:

a data model database storing a plurality of data models, wherein a data model comprises one or more processing models for one or more processing units of one or more edge devices; and a controller which is part of at least one of a cloud computing device and a fog computing device, the controller being configured to:

obtain one or more environmental parameters for each edge device;

select a data model from the data model database for each respective edge device based on the one or more environmental parameters of that respective edge device; and configure each respective edge device in accordance with the selected data model for that respective edge device, wherein the one or more environmental parameters comprise any one or more of the following:

a parameter related to one or more properties of a landmark in the vicinity of an edge device, such as the dimensions and/or usage of that landmark; or a group identification parameter related to the identification of an edge device as belonging to a predetermined group of edge devices.

* * * * *